United States Patent Office 3,536,675
Patented Oct. 27, 1970

3,536,675
PROCESS OF POLYMERIZING VINYL CHLORIDE IN SUSPENSION
Yves J. Fagnoni and Francois M. Muller, Saint-Auban, Basses Alpes, France, assignors to Produits Chimiques Pechiney Saint-Gobain, Paris, France
No Drawing. Filed Apr. 17, 1967, Ser. No. 631,190
Claims priority, application France, Apr. 22, 1966, 58,625
Int. Cl. C08f *3/30, 15/08*
U.S. Cl. 260—78.5
3 Claims

ABSTRACT OF THE DISCLOSURE

Vinyl chloride is polymerized with or without compatible monomers in aqueous suspension in the presence of initiators which are halogenated organic peroxides. Heavier polymers are produced at lower temperatures.

---

This invention relates to the polymerization of vinyl chloride and its copolymerization with compatible monomers in suspension in an inert medium, usually aqueous. The word "polymerized" as used herein includes both homopolymerization and copolymerization.

It has been proposed to use organic peroxides, among which are benzoyl peroxide and lauroyl peroxide, as initiators. The thermal stability of the peroxides depends on their chemical structure and limits the range of temperatures at which they can be used. For instance benzoyl peroxide is only operative between 65°–80° C. and lauroyl peroxide operates at a range from about 55°–70° C. Under such conditions the products are of medium weight and properties. It has also been proposed to polymerize vinyl chloride in the presence of acetyl peroxide and its halogenated derivatives. These have not heretofore given entire satisfaction.

It is an object of this invention to polymerize vinyl chloride at lower temperatures than those which have been effective with prior art peroxides, to produce polymers of higher molecular weight than those which are produced at such temperatures, and to improve the physical and chemical qualities of the product.

The objects of the invention are accomplished generally speaking by polymerizing vinyl chloride with or without compatible monomers at temperatures on the order of $-25°$ to $+40°$ C. in the presence of initiators having the structure

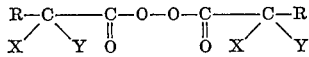

in which R is aliphatic of less than 10 C atoms either saturated, or unsaturated, cycloalkane, cycloalkene, aromatic or heterocyclic, X is halogen, Y is one of a group consisting of H and halogen, and H of R may be replaced by a substituent, such as halogen, which does not affect the fundamental character of the basic formula, and establishing conditions of temperature, pressure, and agitation favorable to polymerization for a time sufficient to produce a substantial yield of polymer.

The process produces novel products, the properties of which are substantially improved with respect to the polymers and copolymers heretofore produced in suspension, with peroxide catalysts at higher temperatures, being superior in these respects, that they are stronger and more rigid at equal temperature, their softening points are higher, and they have a better resistance to the ordinary solvents, particularly to chlorinated hydrocarbons.

According to the invention the polymerization is carried out in suspension at temperatures between about $-25°$ and $+40°$ C. with a preferred range between $-15°$ and $+35°$ C. The initiators employed for the polymerization have the formula

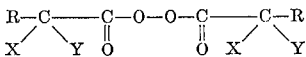

in which X is halogen, and Y is either hydrogen or halogen, halogen being any of chlorine, bromine, iodine, and fluorine, with chlorine being preferred because of cost and efficiency. R is an aliphatic hydrocarbon radical of 1–9 C atoms, either saturated or unsaturated, cycloalkane, cycloalkene, aromatic or heterocyclic, and which may have substituents for hydrogen which do not change the fundamental character of the compound, such as halogen.

Among ethylenic monomers which can be polymerized with vinyl chloride in this system are the vinyl ethers and esters, especially vinyl acetate, vinyl laurate, vinyl stearate, dichloroethylenes including vinylidene chloride, trichloroethylene, acrylonitrile, propenyl chloride, chloroprene, monochlorotrifluoroethylene, and fumaric acid esters.

Among the alpha-halogenated peroxides useful as initiators are the alpha-halogenoacyl peroxides of the aliphatic class, examples of which are alpha-chlorocaproyl peroxide, alpha-chlorobutyroyl peroxide, alpha-chloropropionyl peroxide, alpha-chlorocaprylyl peroxide, alpha-chlorocapryl peroxide, alpha-chlorovaleryl peroxide, alpha-chloroheptanoyl peroxide, alpha-chloropelargonyl peroxide, alpha-chloroundecanoyl peroxide, alpha-bromobutyroyl peroxide, alpha-bromocaproyl peroxide; the alpha-alpha-dihalogenoacyl peroxides of the aliphatic class examples of which are alpha-alpha-dichloropropionyl peroxide, alpha-alpha-dichlorobutyroyl peroxide, alpha-alpha-dichlorocaproyl peroxide, alpha-alpha-dichlorocapryl peroxide, alpha-alpha-dibromopropionyl peroxide, alpha-alpha-dibromocaproyl peroxide; the polyhalogenacyl peroxides of the aliphatic class such as alpha-alpha-beta-trichloropropionyl peroxide, alpha-beta-beta-trichloropropenoyl peroxide, alpha-bromo-beta-beta-dichlorobutyroyl peroxide; the halogenated cycloalkane peroxides such as the acyl peroxide derived from cyclohexyl dichloroacetic acid, the acyl peroxide derived from methyl-2 cyclohexyl bromoacetic acid. Among the cycloalkene peroxides is the acyl peroxide derived from bromo-3-cyclohexenyl-5 chloroacetic acid. From the foregoing list of exemplary initiators it can be determined that the effective group is that which is represented in the formula and that the radical R may undergo the widest change without negating the efficiency of the catalyst.

These initiators may be used in proportions from about 0.001% to 0.1% by weight of active oxygen computed on the weight of the monomer.

These initiators may be employed singly or together, at the same time or in sequence and they may be added at the beginning or during the course of polymerization, it being understood that at least one of these catalysts will be present at the start of polymerization.

These initiators are very active in the temperature range from $-40°$ to $+40°$ C. and that for optimum efficiency particular temperature zones are chosen to suit particular catalysts. Thus, for example, alpha-chloropropionyl peroxide initiates rapid polymerization in suspension between 20° and 35° C. whereas alpha-chlorocaproyl peroxide works best from 10°–25° C. and alpha-alpha-dichloropropionyl peroxide between $-2°$ and $+12°$ C.

The present process is equally applicable to all techniques of polymerization in suspension. For instance, to that which is described in French Pat. 1,385,374.

The invention has equally for its object the polymers and copolymers which are produced by the process which are distinguished from those of the prior art derived from like monomers by a higher specific mass, better resistance to chlorinated solvents and a higher softening point. The following examples illustrate the invention without detracting from the generality of what is elsewhere herein stated.

EXAMPLE 1

A stainless steel autoclave of 100 l. capacity provided with an internal agitator received 50 l. of water and 1100 g. of a 6.8% aqueous solution of polyvinyl alcohol. The temperature of the autoclave having been adjusted to 12° C., 580 g. of a solution of alpha-chlorocaproyl peroxide in hexane was introduced, providing a content of active oxygen of 0.85% by weight. The autoclave was purged by sweeping it out four times with vinyl chloride, then 25 kg. of vinyl chloride monomer were introduced with agitation. The temperature was set at 12° C. After 15 hours of polymerization at that temperature, the unreacted monomer was liberated from the autoclave and the suspension obtained contained the polymer which was withdrawn from the autoclave and dried.

The yield was 23 kg. of dry polyvinyl chloride, a global yield of 92% of a product having an Afnor index of viscosity of 360.

EXAMPLE 2

An operation similar to that of Example 1 was carried out in the same autoclave, the temperature being lowered to 5° C. and the initiator was changed to a 985 g. solution of alpha-alpha-dichloropropionyl peroxide titrating 0.38% by weight of active oxygen. The charges of water and of vinyl chloride remain the same. Polymerization continued for 11 hours after which the unreacted monomer was released and the sludge was dried, yielding 16.1 kg. of dry polymer, a yield of 54.3% of the monomer, of which the Afnor index of viscosity was 410.

The advantages of the invention are in the accomplishment of the objects of the invention, and in the production of superior products by a process of lower temperature and pressure.

As many apparently widely different embodiments of the present invention may be made without departing from the spirit and scope thereof, it is to be understood that the invention is not limited to the specific embodiments.

What is claimed is:
1. A method of polymerizing vinyl chloride which comprises suspending the monomer composition comprising predominantly vinyl chloride in an aqueous liquid medium, including in the same aqueous medium an initiator supplying active oxygen in the proportion of from 0.001% to 0.1% of active oxygen based upon the weight of monomer, said initiator having the formula:

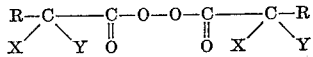

in which R is a radical selected from the group consisting of saturated aliphatic of less than 10 C atoms, unsaturated aliphatic of less than 10 C atoms, cycloalkane, cycloalkene, aromatic and heterocyclic radicals, X is halogen, and Y is selected from the group consisting of H and halogen, and agitating the liquid suspension at a temperature from —40° to +40° C. until a substantial yield of polymer is obtained.

2. A method according to claim 1 in which a comonomer selected from the group consisting of vinyl acetate, vinyl laurate, vinyl stearate, vinyl ethers, dichloroethylene, trichloroethylene, acrylonitrile, propenyl chloride, chloroprene, monochlorotrifluoroethylene, and the esters of fumaric acid is included in the monomer composition.

3. The method according to claim 1 in which the initiator is selected from the class consisting of the aliphatic alpha halogenocyl peroxides, the aliphatic alpha-alpha-dihalogenoacyl peroxides, the aliphatic polyhalogenoacyl peroxides, the halogenated cycloalkane peroxides, and the halogenated cycloalkene peroxides.

References Cited
UNITED STATES PATENTS

| 2,559,630 | 7/1951 | Bullitt | 260—610 |
| 2,792,423 | 5/1957 | Young et al. | 260—610 |
| 3,089,865 | 5/1963 | Walther et al. | 260—92.8 |

HARRY WONG, Jr., Primary Examiner

U.S. Cl. X.R.

260—85.5, 87.1, 87.5, 87.7, 92.8